United States Patent

[11] 3,586,760

[72] Inventor Wolfgang Dillenburger
Niederramstadt near Darmstadt, Germany
[21] Appl. No. 762,393
[22] Filed Sept. 25, 1968
[45] Patented June 22, 1971
[73] Assignee Fernseh G.m.b.H.
Darmstadt, Germany
[32] Priority Sept. 26, 1967
[33] Germany
[31] P 15 97 211.9

[54] COLOR TELEVISION CAMERA GENERATING UNIFORM LAG COLOR COMPONENT SIGNALS
11 Claims, 2 Drawing Figs.

[52] U.S. Cl. .................................................... 178/5.4, 178/5.4 TC, 178/5.4 E
[51] Int. Cl. .................................................... H04n 9/08
[50] Field of Search .................................... 178/5.2, 5.4, 5.4 TC

[56] References Cited

UNITED STATES PATENTS

| | | | |
|---|---|---|---|
| 3,284,566 | 11/1966 | James et al. ................. | 178/5.4 (TC) |
| 3,349,170 | 10/1967 | Felgel-Farnholz et al. .... | 178/5.4 (0) |
| 3,492,412 | 1/1970 | Land ........................... | 178/5.2 |

*Primary Examiner*—Richard Murray
*Attorney*—Michael S. Striker

ABSTRACT: The different color responsiveness of the image tubes of a color television camera to different color components is compensated by different lenses projecting color images having different sizes onto the photosensitive layers of the image tubes, respectively.

Inventor:
Wolfgang Dillenburger by Michael S. Striker

Attorney

COLOR TELEVISION CAMERA GENERATING UNIFORM LAG COLOR COMPONENT SIGNALS

BACKGROUND OF THE INVENTION

In color television cameras, the light passing through the objectives is split into color components so that images in different colors are projected onto the photosensitive layers of a set of image tubes.

The responsiveness of the photosensitive layers is different for the different spectral sections of the color components, so that when white light is divided into color components, the several color components cause the photosensitive layers to generate electric image signals of different amplitude. However, for obtaining a good picture in the receiving television set, the image signals representing red, green and blue color components should have the same amplitude when white light is divided into color components. In accordance with the prior art, this is accomplished by adjusting the preamplifier for the image signals generated by the three image tubes.

The lower limit of illumination, at which a color television camera still produces image signals sufficiently distinct from interference and noise, is determined by the absolute magnitude of the primary color component in the region of the spectrum in which the efficiency of the photosensitive layer is the smallest.

In some image tubes of color television cameras, this lower limit of illumination is not determined by the noise level in the amplified image signal, but the other disturbing phenomena. For example, image tubes having photosensitive layers suffer from persistence of the photosensitive layers which cause the "lagging" of the televised image of a moving object. The charge of the photosensitive layer produced by the image of the moving object, is not completely neutralized and cleared by a single scanning, but produces during several subsequent scanning periods a gradually disappearing remanent signal. Generally speaking, this persistence effect depends on the light intensity of the photosensitive layer in the range of the spectrum of the light illuminating the photosensitive layer are.

In accordance with the prior art, color television cameras having image tubes with photosensitive layers have different sensitivity and responsiveness in different spectral ranges so that the persistence effects for different color components are of a different magnitude. This may cause colored lagging images following the momentary image on the screen of the television receiver, and the lagging image is particularly noticeably since it has a different color than the momentary image of a moving object.

The spectral sensitivity and responsiveness of photosensitive layers, particularly lead oxide photosensitive layers, are substantially smaller in the blue and red spectral ranges than in the green spectral range.

In order to attenuate colored lagging, it has been proposed to reduce the light intensity in the green component channel by a grey filter so that the intensity of the green color component acting on the photosensitive layer of the respective image tube is reduced. However, the grey filter causes a loss of light, which is undesirable when only a small amount of light enters the objective.

SUMMARY OF THE INVENTION

It is one object of the invention to overcome the undesirable effects caused by the different sensitivity of the layers of color image tubes to light components having different spectral ranges.

Another object of the invention is to eliminate lagging color images following a momentary image on the screen of a television receiver.

Another object of the invention is to provide optical means for influencing the color component images in a television camera in such a manner that all component image tubes produce substantially uniform lag image signals.

Another object of the invention is to produce in a set of image tubes receiving color components of white light, potential changes of substantially the same magnitude during scanning.

With these objects in view, the optical system of a color television camera is constructed so that the televised object is imaged at a smaller scale on the photosensitive layers producing the red and blue image signal, than on the photosensitive layer which produces the green image signal.

In accordance with the invention, the potential changes of the color components of white light have substantially the same magnitudes, without the use of light attenuating means. Said potential changes are caused by the discharging of the storage capacity of a picture element by the scanning beam. In this manner, lagging images of moving objects caused by persistence effects of the photosensitive layers, will occur only at substantially smaller light intensities than in color television cameras of the prior art.

Furthermore, even if a lagging image of a moving object occurs, its color does not substantially differentiate from the color of the momentary image so that the lagging image is less noticeable. Consequently, the television camera according to the invention produces better color pictures that known television cameras at a smaller available illumination of the televised object.

A color television camera according to the invention comprises dichroic means for splitting white light coming from an objective into a set of color components, such as green, red and blue, a set of image tubes including photosensitive layers having different responsiveness to different color components and producing potential changes of different magnitude when impinged by color components of different spectral ranges having the same intensity; and a set of optical means, such as lens means for projecting the color components onto the photosensitive layers, respectively.

In accordance with the present invention, the lens means have different optical properties, particularly different focal lengths, selected for compensating the different responsiveness of the photosensitive layers of the set of image tubes. Due to this compensation, the photosensitive layers of all image tubes produce potential changes of substantially the same magnitude.

The focal lengths of the two lens means projecting the red and blue color components, are substantially smaller than the focal length of the lens means of the red color component is greater than the focal length of the lens means of the blue color component and less than the focal length of the lens of the green color component.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
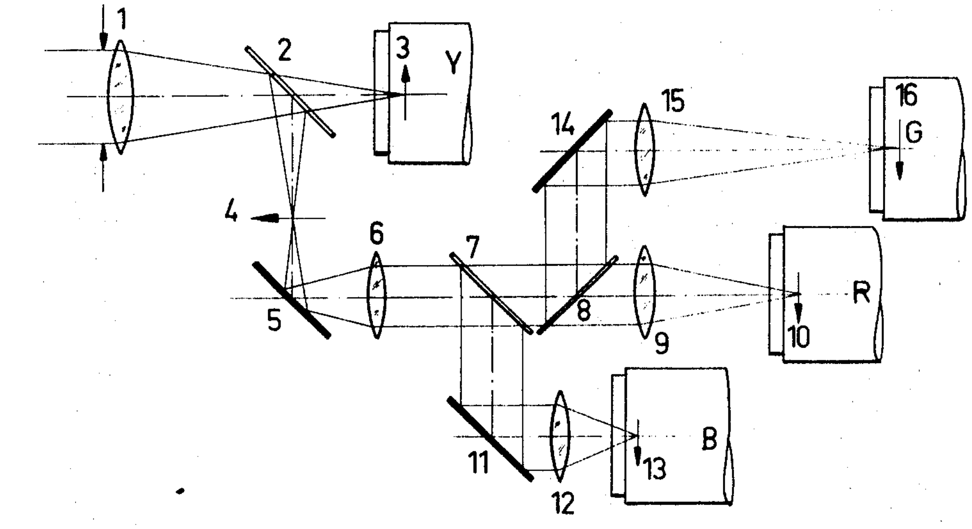
FIG. 1 is a diagrammatic view schematically illustrating a color television camera according to the invention and provided with means for producing a luminescence signal in addition to three color component signals.

Referring first to FIG. 1, an objective 1 has a diaphragm for limiting the bundle of white light rays passing through the entry pupil of the objective. The light falls on a semitransparent mirror 2 which divides the stream of light into a first white light component forming an image tube for producing a luminescence signal Y is located. The luminescence tube is not illustrated since it is of an entirely conventional construction. A panchromatic image of the televised object is formed in the focal plane 3 by objective 1. The second white light component, reflected by the semitransparent mirror 2 is again reflected by a mirror 5 after forming a second image in the plane 4 which is imaged by objective 6 in infinity so that the rays of white light are parallel behind objective 6.

Dichroic means including dichroic mirrors 7 and split the white light passing through objective 6 into different spectral color components. Dichroic mirror 7 reflects the light component within the blue spectral range, and dichroic mirror 8 reflects the color component within the green spectral range. The rays of the red spectral range pass through both dichroic mirrors 7 and 8. The light components of the green and blue spectral ranges are deflected by by mirrors 11 and 14 in the direction parallel to the direction of the light of the red color component.

In the three color component channels, three lenses 9, 13, 15, respectively are located which image the image plane 4 at the color component image planes 10, 13 and 16, respectively where the photosensitive layers of three image tubes for producing color image signals R, B, G are located. The image tubes are of a conventional nature and therefore not illustrated.

The focal length of the lens 15 is selected so that the image of the green color component in the image plane 16 takes up the available area of the photosensitive layer located in the plane 16. In the event that the same type of image tube is used for the green color component as is used for the white light component forming an image on the photosensitive layer in the plane 3, and if the entire available area of the image tube is used for the white image, lens 15 images in plane 16 the image formed in plane 4 in a ratio of 1:1. The opening of lens 15 is selected sufficiently large so that it can project the entire amount of light falling thereon. Assuming that white light passes through objective 1 and objective 6, the image tube produces during scanning a potential change amplitude corresponding to the spectral sensitivity of the photoconductive layer for the green spectral range. Lenses 9 and 12 have a shorter focal length than lens 15 and an opening for receiving the entire respective color component. In this manner, potential changes on the photosensitive layers of the image tubes for producing red and blue color component signals correspond to the potential change of the green color component signal. Due to the shorter focal length of lenses 9 and 12 as compared with lens 15, the scales of the color images in the planes 10 and 13 are reduced, while at the same time the light intensities are increased as compared with an image at the same scale as the image formed in the image plane 16 of the green color component.

Lenses 9 and 12 are preferably selected that, considering the different spectral sensitivities of the photosensitive layers in the red and blue spectral ranges, the potential change produced by the red and blue color components of white light are adjusted to the potential change produced by the green color component.

In order to fully use the available light, lenses 9 and 12, which have a shorter focal length than lens 15, have a correspondingly greater relative aperture. For example, if objective 1 has a relative aperture of 2.8, lens 15 has a relative aperture of 2.8, assuming the same image scale of the green image and of the panchromatic image. Assuming, for example, that the focal lengths of the lenses 9 and 13 in the red and blue color components channels are only half as great as the focal length of lens 15, lenses 9 and 12 must be selected which have a relative aperture of 1.4 so that lenses 9 and 12 can make use of the entire available light of the respective light components.

The pickup tubes are generally least sensitive to red light. In FIG. 1 the focal length of lens 12 is, however, smaller than that of lens 9 in the red channel, because there is only a small share of blue in the illumination of a television studio and the optical means attenuate the blue light to the utmost.

The smaller size of the images on the photosensitive layers of the image tubes for the red and blue color components, as compared with the image sizes on the photosensitive layers of the luminescence image tube and of the green color component image tube, constitute no disadvantage since the band width of the color component signals can be substantially less that the band width of the luminescence signal, which permits a correspondingly lesser resolution of the color images during the scanning.

Figure 2:
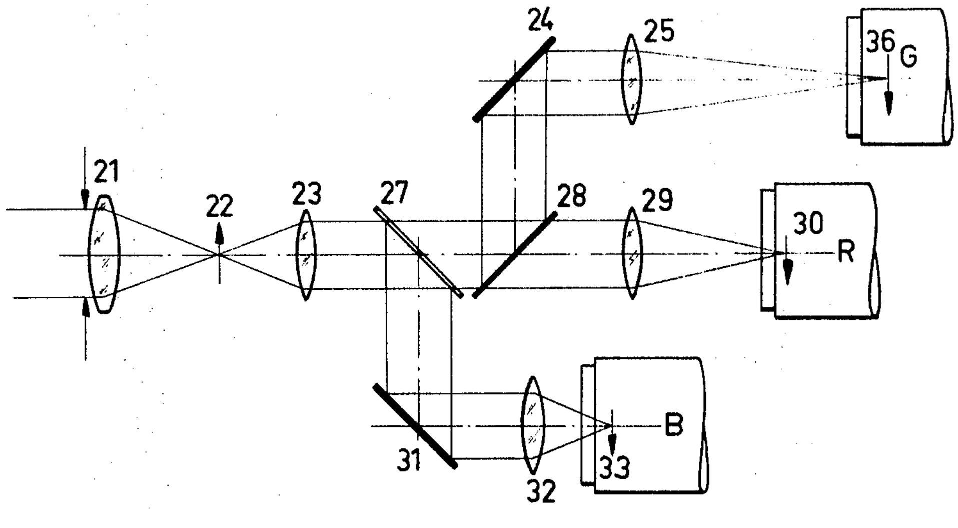
FIG. 2 is a diagrammatic view schematically illustrating a color television camera for producing three color component signals.

FIG. 2 illustrates a television camera in accordance with the invention in which no separate luminescence signal is produced. The white light passing through objective 21 forms an image in the plane 22 which is imaged in infinity by objective 23. The parallel rays behind objective 23 are divided into three color components by dichroic mirrors 27, 28, as explained above for dichroic mirrors 7 and 8, and then deflected by mirrors 31 and 24. The green, red and blue color components are projected by lenses 25, 29, 32 onto image planes 36, 30, 33 where the photosensitive layers of three image tubes are located.

The focal lengths of lenses 25, 29, 32 are again selected so that, assuming that white light is divided into color components, substantially the same potential changes are produced by the image tubes during scanning. The relative apertures of the three lenses 25, 29, 32 are in a ratio which is reciprocal to the ratio between the focal lengths of the three lenses, so that all three lenses 25, 29, 32 have the same entry pupils of such size that they can take up the entire available light of the color components, respectively.

It will be understood that each of the elements described above, or two or more together, may also find a useful application in other types of color television cameras differing from the types described above.

While the invention has been illustrated and described as embodied in a color television camera in which color component images of different size are formed on the photosensitive layers of the image tubes for generating color component signals of substantially the same amplitude, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What I claim as new and desired to be protected by Letters Patent is set forth in the appended claims.

1. Color television camera comprising, in combination, an objective; dichroic means for splitting light coming from said objective into a set of color components and forming a set of color component channels; a set of image tubes including photosensitive layers having different sensitivity to different color components and producing potential changes and color component signals of different magnitude when impinged by color components of different spectral ranges having the same intensity; and a set of optical means located in said color component channels, respectively, for projecting said color components onto said photosensitive layers, respectively, at least one optical means of said set having different optical properties than the other optical means of said set and including lens means for forming on the respective layer a color component image having a different size than the other color component images, and selected for compensating different sensitivities of said layers to different color components so that the photosensitive layers of all image tubes produce potential changes of substantially the same magnitude.

2. Color television camera as claimed in claim 1 wherein said lens means forms in the respective color component channel a color image which is smaller that the color images in the respective other color component channels.

3. Color television camera as claimed in claim 1 wherein said set of optical means includes a set of different lens means having different optical properties for forming on said layers color component images having different sizes, respectively, said sizes being selected for compensating said different sensitivities of said layers to different color components.

4. Color television camera as claimed in claim 3 wherein said dichroic means produce green, blue and red color components; and wherein said lens means have such different optical properties that the images formed of said blue and red color components by two of said lens means on the photosensitive layers of two of said image tubes are substantially smaller than the image formed of said green color component by a third lens means on the photosensitive layer of a third image tube.

5. Color television camera as claimed in claim 1 wherein said set of optical means includes a set of lens means, said lens means having different focal lengths, and focal points located on said photosensitive layers of said image tubes, respectively, for forming images having different sizes on said photosensitive layers, respectively.

6. Color television camera as claimed in claim 1 wherein said dichroic means produce green, blue and red color components; wherein said set of optical means includes a set of lens means, said lens means having different focal lengths, and focal points located on said photosensitive layers of said image tubes, respectively, for forming images having different sizes on said photosensitive layers, respectively; wherein said lens means are located in said color component channels associated with said green, blue and red color components, respectively; and wherein the focal lengths of the two lens means in the red and blue color component channels are substantially smaller than the focal length of the lens means in the green color component channel.

7. Color television camera as claimed in claim 6 wherein the focal lengths of the two lens means in said red and blue color component channels are about half the focal length of the lens means located in said green color component channel.

8. Color television camera as claimed in claim 6 wherein the focal length of the lens means in said red color component channel is less than the focal length of the lens means in said green color component channel and at least as great as the focal length of the lens means in said blue color component channel.

9. Color television camera as claimed in claim 1 wherein said dichroic means produce blue, red and green color components; wherein said set of optical means includes a set of lens means located in blue, red and green color component channels, respectively; and wherein the focal length of the lens means in said red color component channel is less than the focal length of the lens means in said green color component channel and greater then the focal length of the lens means in said blue color component channel.

10. Color television camera as claimed in claim 9 wherein said lens means of said set of lens means have relative apertures in a ratio reciprocal to the ratio between said focal lengths so that the amounts of colored light of said three color components projected by said lens means onto said photosensitive layers of said image tubes, respectively, are the same.

11. Color television camera as claimed in claim 1 comprising a semitransparent mirror for dividing white light from said objective into first and second white light components; a luminescence image tube having a photosensitive layer receiving said first white light component; and optical means for guiding said second white light component to said dichroic means for splitting into said color components.